United States Patent

[11] 3,597,961

[72] Inventor Carlos D. Pinkstaff
 Hammond, Ind.
[21] Appl. No. 748,047
[22] Filed July 26, 1968
[45] Patented Aug. 10, 1971
[73] Assignee I-T-E Imperial Corporation

[54] FLUID OPERATED SENSING DEVICE
 16 Claims, 5 Drawing Figs.
[52] U.S. Cl. .................................................. 73/37.5
[51] Int. Cl. ................................................ G01b 13/12
[50] Field of Search............................................. 73/37-
 —37.9; 226/22; 33/DIG. 2

[56] References Cited
 UNITED STATES PATENTS
3,210,987 10/1965 Bruns .......................... 73/37.6
3,260,435 7/1966 Jacobsen ..................... 73/37.7 X
3,285,608 11/1966 Lyman ........................ 73/37.7 X 3,353,402 11/1967 Caligiuri ...................... 73/37.5
3,371,517 3/1968 Roth............................. 73/37.5
3,407,706 10/1968 Ott, Jr. ....................... 226/22
3,470,733 10/1969 Rule et al..................... 73/37.5
3,482,433 12/1969 Gladwyn ..................... 73/37.5
 FOREIGN PATENTS
879,466 6/1953 Germany..................... 73/37.5
1,029,826 5/1966 Great Britain............... 73/37.5

Primary Examiner—Louis R. Prince
Assistant Examiner—William A. Henry, II
Attorney—Hofgren, Wegner, Allen, Stellman and McCord ABSTRACT: A sensor for sensing the presence of an object or an opposed fluid jet which operates on air or other gases including a nozzle for directing supply fluid in a generally conical flow pattern and a pickoff or sensing passage opening within the conical flow adapted to sense pressure increases therein when the flow pattern in resisted or interrupted.

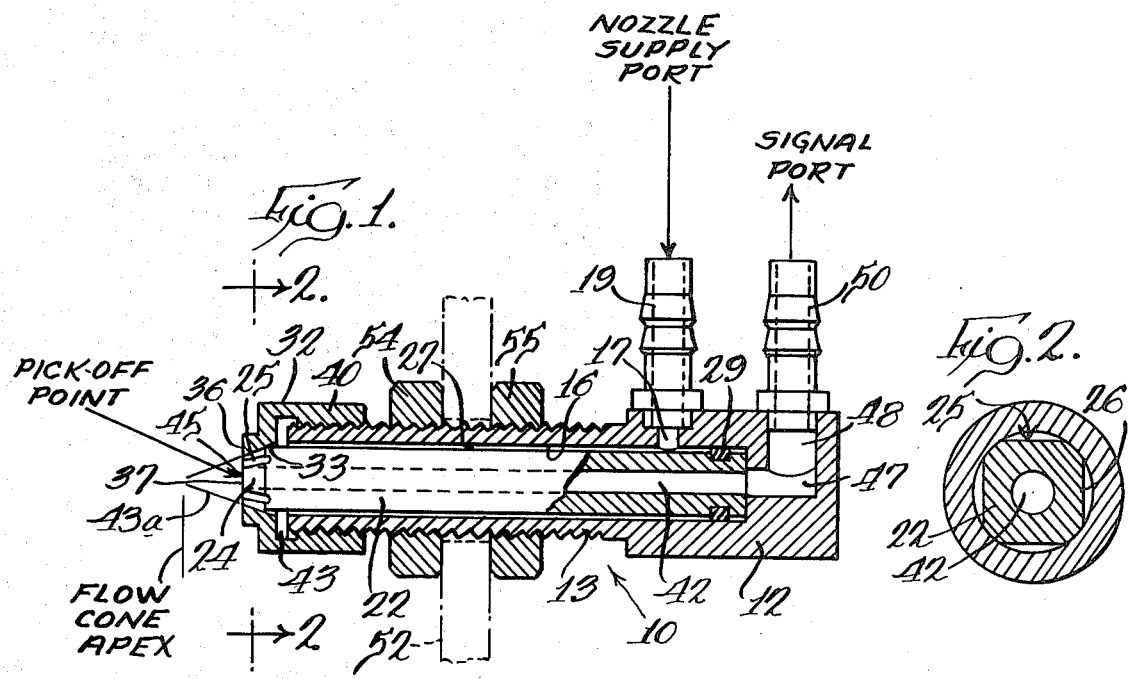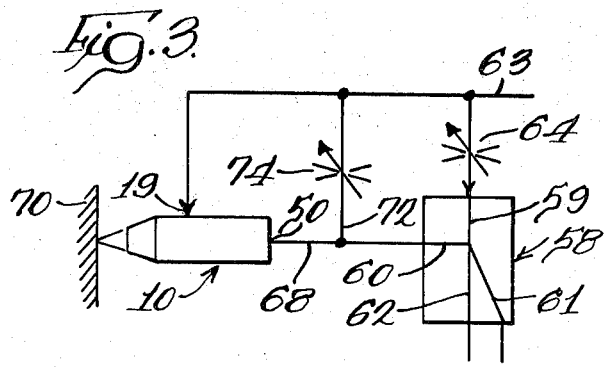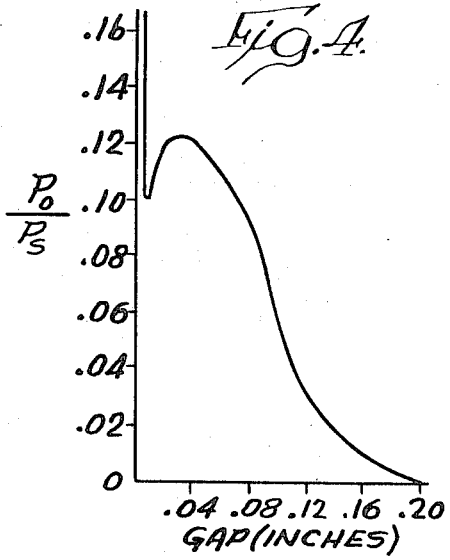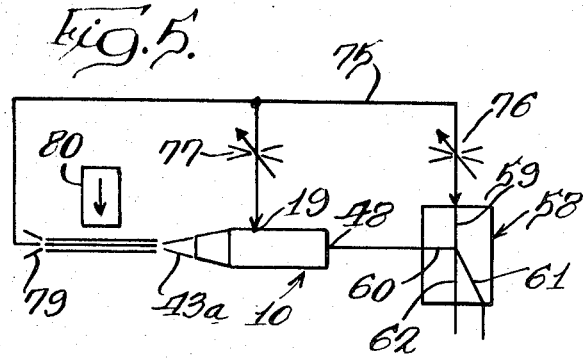
Inventor:
Carlos D. Pinkstaff
By Hofgren, Wegner,
Allen, Stellman & McCord
Att'ys

FLUID OPERATED SENSING DEVICE

BACKGROUND OF THE INVENTION

Various devices have been provided in the past for sensing the presence of an object in response to pressure variations in a fluid stream. These devices, however, have operated primarily on an increase in the back pressure of a primary stream as it impinges the sensed object. Such devices require a very small "gap," i.e. the distance between the point of exit of the jet fluid stream from the sensing device and the sensed object.

It is apparent that this is a significant disadvantage since it is certainly desirable to sense the presence of objects at greater distances from the sensor nozzle.

Moreover, these prior designs are incapable of providing a very high pressure variation in response to the sensed condition compared to supply pressure. They also consume significant quantities of gas which is a disadvantage in environments where the sensor operates continuously.

SUMMARY OF THE PRESENT INVENTION

The present device is a cone jet sensor which senses the presence of an object or an opposed fluid jet stream with far less flow consumption than in prior devices and permits sensing "gaps" as much as 10 times greater than provided in conventional back pressure sensors. This sensor is particularly suitable for use with fluidic circuits such as those described in the copending application Ser. No. 601,919, to E. J. Purcell Filed Dec. 15, 1966, now U.S. Pat. No. 3,548,849 entitled Fluid Circuit Package, assigned to the assignee of the present invention.

The present sensor includes a frustoconical supply nozzle defined by a plurality of converging channels which when supplied with fluid under pressure form a converging conical flow pattern. Opening at the base of the conical flow pattern is a pickoff passage which provides the output signal for the sensor. The pickoff passage thus opens to the interior of the conical flow pattern. As a resistance develops to the conical flow pattern by the presence of an object or an opposing jet stream the pressure within this converging flow pattern increases providing an increase in pressure in the pickoff passage and a signal port communicating therewith. The increased pressure signal at the signal port is used to control one or more fluidic devices in circuit with the jet sensor. The sensor thus is a component in a fluidic circuit.

The output impedance of the sensor is low and the flow recovery is high enough to control other fluidic components operating at the same supply pressure. The converging flow pattern of high velocity gas allows precision sensing of edges, steps, grooves, small diameter objects, and even cloth or screen mesh. The efficiency of the pressure and flow recovery of this device makes possible the sensing of "gaps" as great as 0.2 inches.

A further feature of the present sensor in a fluidic circuit is that the signal port may be biased by a fluid signal for the purpose of increasing the permissible sensing gap.

An additional advantage of the present sensing circuit is that the conical flow pattern coupled with the pickoff passage being within the flow pattern protects the pickoff passage so that it is isolated from contamination by the surroundings. This makes the sensor particularly suitable as a receiver in an interruptible jet sensing circuit described in more detail below.

BRIEF DESCRIPTION OF THE DRAWING

FIG. 1 is an elevation view partly in section of the present sensor;

FIG. 2 is an enlarged cross section taken generally along line 2-2 of FIG. 1;

FIG. 3 is a fluidic proximity sensing circuit including the sensor shown in FIG. 1;

FIG. 4 is a curve illustrating variations in signal pressure from the sensing circuit of FIG. 3 as a function of "gap," and FIG. 5 is a schematic fluidic circuit arranged for interruptible jet sensing.

While I have shown and shall hereinafter describe one embodiment of the invention, it is to be understood that it is capable of many modifications. Changes, therefore, in the construction and arrangement may be made without departing from the spirit and scope of the invention as defined in the appended claims.

DETAILED DESCRIPTION OF THE PREFERRED EMBODIMENT

The cone jet sensor 10 shown in FIGS. 1 and 3 is adapted to be used in either the proximity sensing circuit shown in FIG. 3 (for sensing the presence of an object or liquid), or the interruptible jet sensing circuit of FIG. 5 (which senses the interruption of an opposed axially aligned jet by an object).

The sensor 10 shown in FIG. 1 is seen to include a cylindrical body member 12 having a reduced threaded sleeve portion 13 extending therefrom. A central bore 16 in the body 12 has a supply port 17 communicating therewith. Fluid is supplied to the port 17 by a suitable supply fitting 19 fixed to the body member 12.

Seated within the body 12 is an inner cylindrical member 22 having one end thereof engaging the bottom of bore 16 and the other end projecting from the sleeve portion 13. The projecting end of cylindrical member 22 has a frustoconical portion 24 with a plurality of flat surfaces 25 formed therein on the slant height of the truncated cone.

The cylindrical member 22 has a smaller outer diameter than the diameter of bore 16 so that an annular supply passage 27 is defined therebetween. For the purpose of centering the member 22 within the bore 16 and for the purpose of sealing annular passage 27 from the inner end of bore 16 a suitable sealing member 29 is provided near the inner end of the bore 16.

An annular nozzle cover member 32 is provided with an internal conical surface 33 matingly engaging surface 24 for the purpose of defining a plurality of flow channels 26 with the flats 25 and for the purpose of holding and centrally aligning the cylindrical member 22 with respect to bore 16. The frustoconical portion 33 is sized so that end surface 36 of the nozzle cover member lies in a plane which is slightly extended beyond the parallel plane formed by end surface 37 of the cylindrical member 22. Such offsetting of surfaces 36 and 37, is necessary to prevent a loss of pressure signal within the passage 42 when a flat surface is brought flush against end surface 36 of the nozzle cover member, thus blocking channels 26. Nozzle cover 32 has an annular threaded portion 40 threadedly engaging the end of sleeve 13 and when threaded toward the fitting 19 urges the cylindrical member 22 against the bottom of bore 16. Defined between the cover 32 and the end of sleeve 13 is a closed chamber 43 so that supply flow from annular passage 26 is directed only into the channels 26. In this manner the channels 26 when supplied with gas, such as air, under sufficiently high pressure, will provide a high velocity flow of fluid from the sensor having a generally conical flow pattern.

Any resistance to the free conical flow pattern provides a pressure increase within the flow cone and this is employed in the present device to provide an increasing pressure output signal. Toward this end the cylindrical member 22 is provided with a central passage 42 extending completely therethrough and opening to end face 37 at the base of the flow cone generally designated at 43a in FIG. 1. The passage 42 thus defines a pickoff point 45 at its juncture with face 37. The other end of passage 42 communicates with passages 47 and signal port 48 in body member 12. It should be noted that seal 29 seals passage 27 from port 48. A suitable fitting 50 is provided for the signal port.

For the purpose of attaching the sensor 10 to a mounting plate such as indicated in dotted lines at 52 in FIG. 1, threaded fasteners 54 and 55 are provided each surrounding and threadedly engaging the sleeve 13. With the sleeve 13 extending through the mounting plate 52, the fasteners of 54 and 55 may be threaded into positions flanking and tightly engaging the sides of plate 52 thereby holding the sensor 10 in position. MOreover, the fasteners 54 and 55, by suitable positioning along the sleeve 13, permit an axial adjustment of the entire sensor 10.

The device shown in FIG. 1 is employed as a proximity sensor for sensing the presence of an object as follows. With the fitting 19 connected to a suitable source of fluid under supply pressure the channels 26 provide an essentially conic converging flow pattern. When resistance is presented to the fluid flow exiting from the channels 26, such as by an object positioned on the side of the apex of the cone 43a toward the surface 37, the pressure within the cone increases as a continuous function of the object's proximity to the base of the cone (i.e. surface 37). This relationship can clearly be seen in FIG. 3 wherein the pressure in pickoff passage 42 or the signal port 48 ($P_o$) is seen to increase fairly proportionally with a reduction in gap from 0.2 inches to 0.04 inches, the height of the cone in the construction shown in FIG. 1 is somewhat greater than 0.2 inches. It has been found that the gap may be increased by decreasing the apex angle of cone 43a. The maximum permissible gap appears to be provided at an apex angle of approximately 20°. For a given apex angle angle the amount of flow and pressure which can be produced at the signal port 48 increases as the supply pressure increases and as the object nears the cone base.

If an opposing jet is employed as in the embodiment of FIG. 5 the pressure within the cone 43a increases as a continuous function of the strength of the opposing jet, and the pressure at signal port 48 will increase as the strength of the opposing jet increases.

The sensor 10 is shown in a fluidic proximity sensing circuit in FIG. 2. This circuit includes a fluidic device 58 which may be a monostable switching component including a supply port 59, a control port 60, an output port 61 and a preferred output port 62. The fluidic device 58 is known per se and in the absence of a sufficient signal at control port 60 supply flow entering port 59 will exit through output port 62 rather than output port 61. When the control signal at port 60 reaches a sufficient pressure level the supply flow from port 59 will be directed out port 61 rather than port 62. The signals for ports 61 and 62 can control a wide variety of control components.

A source of fluid under pressure is provided to the fluidic device 58 and supply fitting 59 by supply line 63. A suitable resistor 64 may be provided for reducing the pressure of fluid entering supply port 59. Passage 63 is connected with supply fitting 19 of the sensor 10. A suitable conduit 68 connects the signal fitting 50 to the control port 60. With this circuit, as object 70 moves sufficiently close to the sensor 10, the pressure at the signal port 48 and in line or conduit 68 will reach a sufficient value to switch the output signal in the fluidic device 58 from the output port 62 to the output port 61 and thereby provide a change in control state elsewhere in the associated circuit providing perhaps some additional function upon the occurrence of this output signal.

For the purpose of providing higher pressure signals in line 68 the fluid in this line may be biased by supply pressure in line 63 through a suitable line 72 interconnecting line 63 and 68 with a variable fluidic resistor 74 therein for providing the necessary pressure drop between these lines. There will be some increase in the flow consumption of the sensor when the biasing arrangement is provided.

The cone jet sensor may be used in an interruptible jet circuit as shown in FIG. 5 wherein like reference numerals are employed to denote like parts. Supply fluid in line 75 is applied to supply port 59 through variable resistor 76 and supply fitting 19 of the jet sensor 10 through variable resistor 77. Supply fluid in line 75 is also directed to a nozzle 79 which is axially aligned with the jet sensor 10, and in the absence of an interrupting object 80 the nozzle 79 directs a jet of fluid against the conical flow exiting from the cone jet sensor 10. Under these conditions, and with the resistor 77 suitably adjusted, the flow exiting from nozzle 79 will provide sufficient resistance for the flow cone exiting from jet sensor 10 to provide an increase in pressure at the signal port 48 sufficient to maintain the flow from the fluidic device 58 in output port 61. When an object 80 interrupts the jet from nozzle 79 the conical flow pattern 43a becomes unrestricted and the pressure in signal port 48 drops, reducing the pressure in control port 60 and permitting the supply flow through fluidic device 58 to return to the favored output leg 62.

I claim:

1. A sensing circuit for determining the proximity or presence of an object, comprising: a sensing device for providing a fluid signal in response to a sensed condition, said sensing device having fluid supply port means and fluid signal port means, means in said sensing device for forming a substantially free generally conical flow pattern in a sensing area, said means for providing a generally conical flow pattern including means defining a plurality of separate supply nozzle passages lying in the surface of a common cone, means in said device for sensing a restriction of said flow pattern and varying said fluid signal in said signal port means in response thereto, means for supplying fluid to said supply port means, and a fluid operated valve responsive to said fluid signal.

2. A sensing circuit as defined in claim 1, wherein said means for sensing a restriction includes a pickoff passage opening within said generally conical flow pattern.

3. A sensing circuit as defined in claim 2, wherein said pickoff passage has an end substantially coplanar with the base of said conical flow pattern.

4. A sensing circuit as defined in claim 1, further including fluid supply means connected with said signal port means for biasing the latter.

5. A sensing circuit as defined in claim 1, including a nozzle generally opposed to the sensing device for directing an interruptible stream of fluid against said generally conical flow pattern, said sensing device when said stream is interrupted providing a fluid signal from said signal fluid port means.

6. A sensing circuit as defined in claim 1, including a source of fluid under supply pressure, said valve means including a fluidic device having a supply port, a control port and at least one output port, means connecting said fluid source to said sensing device supply port means and said fluidic device supply port, means connecting said signal port means to said control port means whereby the fluidic device provides an output signal at said output port when a fluid signal is received at the control port from said sensing device.

7. A sensing circuit for determining the proximity or presence of an object, comprising: a sensing device for providing a fluid signal in response to a sensed condition, said sensing device having fluid supply port means and fluid signal port means, means in said sensing device for forming a substantially free generally conical flow pattern in a sensing area, means in said device for sensing a restriction of said flow pattern and varying said fluid signal in said signal port means in response thereto, means for supplying fluid to said supply port means, a fluid operated valve responsive to said fluid signal, said sensing device including an inner tube having a central passage therein communicating at one end with said signal port means, said inner tube having a conical outer surface adjacent the other end thereof, a sleeve surrounding and spaced from said inner tube and defining therebetween an annular supply passage communicating with said supply port means, and a nozzle member communicating with said annular passage and surrounding said conical surface to provide said generally conical flow pattern, said conical surface having a plurality of separate channels therein which provide the generally conical flow pattern.

8. A sensing circuit for determining the proximity or presence of an object, comprising: a sensing device for providing a fluid signal in response to a sensed condition, said sensing device having fluid supply port means and fluid signal port means, means in said sensing device for forming a substantially free generally conical flow pattern in a sensing area, means in said device for sensing a restriction of said flow pattern and varying said fluid signal in said signal port means in response thereto, means for supplying fluid to said supply port means, a fluid operated valve responsive to said fluid signal, including mounting means for said sensing device, and means for axially adjusting said sensing device.

9. A sensing device for sensing the presence of an object or fluid, comprising: supply means adapted to receive supply fluid, means for directing said supply fluid into a generally conical flow pattern, said means for directing supply fluid into a generally conical flow pattern including a plurality of discrete supply passages in conical array, and means to sense a restriction in said flow pattern produced by the object or fluid.

10. A sensing device as defined in claim 9, wherein said means for sensing a restriction is responsive to a fluid flow condition within said conical flow pattern.

11. A sensing device as defined in claim 10, wherein said means for sensing a restriction includes passage means coaxial with said flow pattern and opening substantially at the base of said conical flow pattern.

12. A sensing device as defined in claim 9 wherein said means for directing supply fluid produces a flow pattern having an apex angle of approximately 20° to maximize the permissible distance between said directing means and the sensed object.

13. A cone jet sensor for sensing the presence of an object or an opposed axial jet, comprising: a generally sleeve shaped body member having a supply port and a signal port, an inner tube mounted within and spaced from said body member defining therebetween an annular axially extending supply passage communicating with said supply port, one end of said inner tube projecting from said body members and having an end portion of frustoconical shape, said end portion having a plurality of channels defining nozzles communicating with said annular passage, an annular nozzle member surrounding and engaging said conical end portion, said nozzle member being threadedly engaged with said body member, said inner tube having a central passage opening at said end portion and communicating with said signal port, and two threaded fasteners surrounding said body member and threadedly engaging the same for attaching the sensor to a mounting plate and permitting axial adjustment of the sensor with respect to the plate.

14. A sensing device providing a fluid signal in response to a sensed condition, comprising: means for supplying fluid under pressure, means communicating with said supply means for forming a flow pattern having a free generally conical portion, said means for forming a flow pattern including a plurality of small discrete supply passages in conical array, sensing means within said forming means for sensing pressure within said flow pattern and signal port means responsive to said sensing means for providing a fluid output signal.

15. A sensing device as defined in claim 14, wherein said conical portion is in the form of a convergent cone.

16. A cone jet sensor for sensing the presence of an object or an opposed axial jet, comprising: a generally sleeve shaped body member having a supply port and signal port, an inner tube mounted within said body member defining therebetween an annular axially extending supply passage communicating with said supply port, one end of said inner tube having an end portion of frustoconical shape, an annular nozzle member having an end portion surrounding and engaging said inner tube end portion to axially and radially locate said inner tube, one of said end portions having a plurality of channels defining nozzles communicating with said annular passage, said nozzle member being fixed with respect to said body member, said inner tube having a central passage opening at said end portion and communicating with said signal port.